(12) United States Patent
Raman et al.

(10) Patent No.: US 9,778,951 B2
(45) Date of Patent: Oct. 3, 2017

(54) TASK SIGNALING OFF A CRITICAL PATH OF EXECUTION

(71) Applicant: QUALCOMM Incorporated, San Diego, CA (US)

(72) Inventors: Arun Raman, Fremont, CA (US); Pablo Montesinos Ortego, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/884,929

(22) Filed: Oct. 16, 2015

(65) Prior Publication Data

US 2017/0109195 A1    Apr. 20, 2017

(51) Int. Cl.
G06F 9/48 (2006.01)

(52) U.S. Cl.
CPC ............ *G06F 9/485* (2013.01); *G06F 9/4812* (2013.01); *G06F 9/4843* (2013.01)

(58) Field of Classification Search
None
See application file for complete search history.

(56) References Cited

U.S. PATENT DOCUMENTS

| 7,849,465 | B2 | 12/2010 | Zou et al. | |
|---|---|---|---|---|
| 8,195,898 | B2 | 6/2012 | Welc et al. | |
| 8,209,702 | B1 * | 6/2012 | Roytman | G06F 9/5027 718/106 |
| 9,052,796 | B2 | 6/2015 | Brun | |
| 2007/0022422 | A1 * | 1/2007 | Tirumalai | G06F 8/4442 718/100 |
| 2008/0141268 | A1 | 6/2008 | Tirumalai et al. | |
| 2010/0037222 | A1 * | 2/2010 | Tatsubori | G06F 9/542 718/100 |
| 2010/0281471 | A1 * | 11/2010 | Liao | G06F 8/4442 717/141 |
| 2011/0145834 | A1 * | 6/2011 | Damron | G06F 9/485 718/107 |
| 2015/0095912 | A1 * | 4/2015 | Semin | G06F 9/5033 718/102 |

FOREIGN PATENT DOCUMENTS

WO    2015050594 A2    4/2015

OTHER PUBLICATIONS

Lee J., et al., "Prefetching with Helper Threads for Loosely Coupled Multiprocessor Systems," IEEE Transactions on Parallel and Distributed Systems, 2009, vol. 20, pp. 1-16.
International Search Report and Written Opinion—PCT/US2016/051729—ISA/EPO—Dec. 2, 2016.

* cited by examiner

*Primary Examiner* — Syed Roni
(74) *Attorney, Agent, or Firm* — The Marbury Law Group, PLLC

(57) ABSTRACT

Embodiments include computing devices, systems, and methods for task signaling on a computing device. Execution of a task by an initial thread on a critical path of execution may be interrupted to create at least one parallel task by the initial thread that can be executed in parallel with the task executed by the initial thread. An initial signal indicating the creation of the at least one parallel task to a relay thread may be sent by the initial thread. Execution of the task by the initial thread may resume before an acquisition of the at least one parallel task.

30 Claims, 10 Drawing Sheets

TASK SIGNALING OFF A CRITICAL PATH OF EXECUTION

BACKGROUND

Building applications that are responsive, high-performance, and power-efficient is crucial to delivering a satisfactory user experience. To increase performance and power efficiency, parallel sections of a program can be executed by one or more threads running on one or more computing cores, on a central processing unit (CPU), graphics processing unit (GPU), or other parallel hardware. Typically, one thread, called the "main thread", enters the parallel section, creates helper tasks, and notifies the other threads to help in the execution of the parallel section.

While task creation is typically inexpensive, notifying other threads can be relatively very expensive because it often involves operating system calls. For example, on a top-tier quad-core smartphone, the latency to signal threads waiting on a condition variable can be as high as 40 microseconds (approximately 90,000 CPU cycles). Each of the several parallel sections of code may take under 40 microseconds to execute, making such high signaling costs unacceptable for parallel execution. During signaling on the critical path of execution, execution of the parallel section does not begin on either the critical path of execution or another thread, initiated by the signaling, until the signaling is completed. Thus, rather than speeding up the original section of code on the critical path of execution, the parallelization slows down the execution on the critical path of execution by nearly a factor of two. Some of this latency can be recovered when the other thread executes a task in parallel with the task on the critical path of execution.

SUMMARY

The methods and apparatuses of various embodiments provide circuits and methods for task signaling on a computing device. Various embodiments may include interrupting execution of a task by an initial thread on a critical path of execution, creating at least one parallel task by the initial thread that can be executed in parallel with the task executed by the initial thread, sending an initial signal indicating the creation of the at least one parallel task to a relay thread by the initial thread, and resuming execution of the task by the initial thread before an acquisition of the at least one parallel task.

Some embodiments may further include receiving the initial signal by the relay thread, and changing the relay thread to an active state in response to receiving the initial signal when the relay thread is in a wait state.

In some embodiments, the initial signal may be a direct initial signal, and receiving the initial signal by the relay thread may include receiving the direct initial signal via a connection with the initial thread.

In some embodiments, the initial signal may be an indirect initial signal, and the embodiments may further include modifying data at a location of a memory device indicating the creation of the at least one parallel task in which receiving the initial signal by the relay thread may include retrieving the modified data from the location of the memory device.

Some embodiments may further include sending a relay signal indicating the creation of the at least one parallel task to at least one work thread.

Some embodiments may further include receiving the relay signal by the at least one work thread, changing the at least one work thread to an active state in response to receiving the relay signal when the at least one work thread is in a wait state, acquiring the at least one parallel task by the at least one work thread, and executing the at least one parallel task by the at least one work thread in parallel with the execution of the task by the initial thread.

Some embodiments may further include determining whether another parallel task remains by the relay thread, acquiring the another parallel task by the relay thread, and executing the another parallel task by the relay thread in parallel with the execution of the task by the initial thread.

Some embodiments may further include determining whether a state change threshold for the relay thread is surpassed, and changing a state of the relay thread from an active state to a wait state or from a level of the wait state to a lower level of the wait state in response to determining that the state change threshold for the relay thread is surpassed.

Various embodiments may include a computing device configured for task signaling. The computing device may include a plurality of processor cores communicatively connected to each other, in which the plurality of processor cores includes a first processor core configured to execute an initial thread, a second processor core configured to execute a relay thread, and a third processor core configured to execute a work thread, and in which the processor cores are configured to perform operations of one or more embodiment methods described above.

Various embodiments may include a computing device configured for task signaling having means for performing functions of one or more of the aspect methods described above.

Various embodiments may include a non-transitory processor-readable storage medium having stored thereon processor-executable instructions configured to cause a processor of a computing device to perform operations of the methods described above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
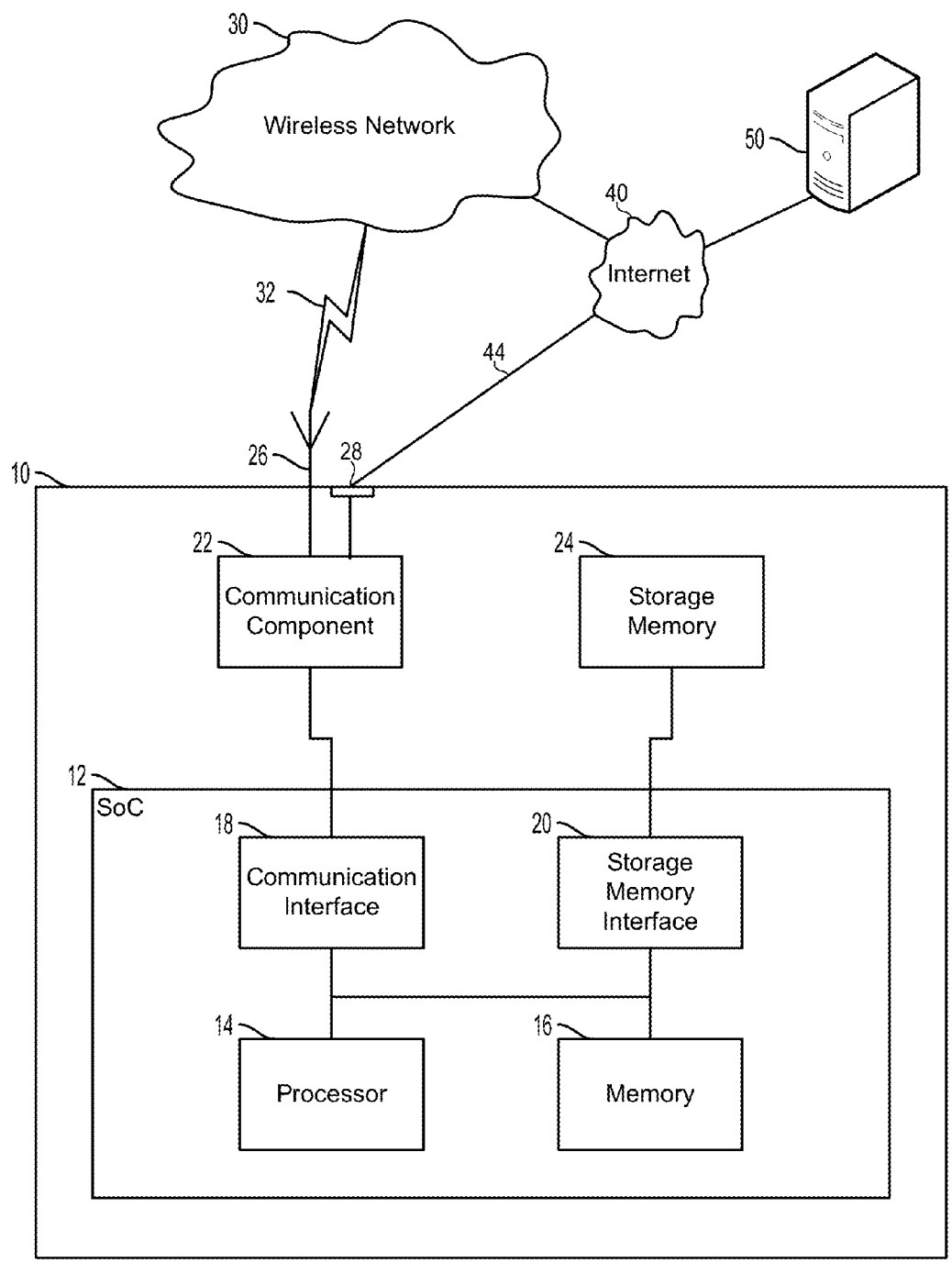
FIG. 1 is a component block diagram illustrating a computing device suitable for implementing an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a multi-core programmable processor. While the various embodiments are particularly useful for mobile computing devices, such as smartphones, which have limited memory and battery resources, the embodiments are generally useful in any electronic device that implements a plurality of memory devices and a limited power budget in which reducing the power consumption of the processors can extend the battery-operating time of a mobile computing device. The term "computing device" may further refer to stationary computing devices including personal computers, desktop computers, all-in-one computers, work stations, super computers, mainframe computers, embedded computers, servers, home theater computers, and game consoles.

Embodiments include methods, and systems and devices implementing such methods for improving device performance by reducing the signaling burden on the critical path of execution and implementing the signaling by a dedicated thread. The embodiments include methods, systems, and devices for a hybrid signaling scheme including signaling, by an initial thread, of a parallel task for execution to a dedicated relay thread, and signaling by the relay thread of the parallel tasks for execution to one or multiple work threads.

An outer process executing on a device may include parallel sections that may be executed in parallel with the outer process. The parallel sections may include any processes that may be executed in parallel with the outer process. For ease of explanation, the parallel sections are described herein using the nonlimiting example of nested loops. The nested loops may involve multiple executions for various executions of inner processes. To help execute the nested loops of the outer processes, an initial thread on a critical path of execution for an outer process creates parallel tasks to execute by other work threads, such as threads executed on a different processor or processor core as the initial thread.

The initial thread may signal a relay thread that a parallel task is created for execution by a work thread. Signaling a thread by an initial thread (e.g., direct initial signaling the thread) to notify the thread of creation of a parallel task for execution by the thread interrupts the execution of the task by the main thread in the critical path of execution. In an embodiment, the relay thread may actively check or wait for a signal from the initial thread (e.g., direct initial signal to the relay thread or setting of a Boolean in memory monitored by the relay thread).

The signal by the initial thread to the relay thread may include a signal to the relay thread configured to notify the relay thread of the creation of a parallel task for execution by a thread other than the initial thread, such as a work thread or the relay thread itself. The signal by the initial thread to the relay thread may include a direct initial signal to the relay thread, which may wakeup the relay thread from an idle or inactive thread. The signal by the initial thread to the relay thread may include setting a value to a location in memory, such as a Boolean flag in a register, indicating that the parallel task is created, in which case the relay thread may periodically check the location in memory for the value indicating that the parallel task is created. I In either embodiment, it is only necessary for the initial thread to signal the relay thread to initiate parallel processing of the created parallel task(s). Thus, the initial thread does not have to signal other work threads, thereby reducing the amount of time and resources spent by the initial thread to signal that the parallel task is created. After sending signals to the relay thread, the initial thread returns to executing its task on the critical path of execution without assuming the overhead of having to send more signals to work threads, or in various embodiments, having to wait for the created parallel task to be acquired by a work thread or relay thread.

In an embodiment, the initial thread may signal multiple relay threads by writing the value (e.g., a Boolean) to the location in memory that is accessible by the multiple relay threads, or by directly signaling the notification signal to each relay thread. The number of the multiple relay threads may be less than or equal to the number of the multiple work threads. The number of the relay threads and work threads, and an assignment of a set of work threads to a relay thread may be configured based on performance and/or power requirements, and may be configurable for each process.

In response to receiving the signal from the initial thread, the relay thread may signal a set of work threads that may be assigned to processors or processor cores in an active, idle, or inactive state while waiting for the signal by the relay thread. The signal by the relay thread may cause one or more of the work threads to wake up, retrieve the parallel task, and execute the parallel task. The signaling of the work thread may be implemented through operating system calls that can specify particular work or relay threads within a set of work or relay threads to receive the signal or broadcast the signal to the set of work threads. In an embodiment, a processor or processor core assigned to a specified signaled work thread may be pre-assigned to execute the parallel task. In an embodiment, broadcasting the signal may create a race condition between the processors or processor cores assigned with work threads to be assigned to execute the parallel task.

FIG. 1 illustrates a system including a computing device 10 in communication with a remote computing device 50 suitable for use with the various embodiments. The computing device 10 may include a system-on-chip (SoC) 12 with a processor 14, a memory 16, a communication interface 18, and a storage memory interface 20. The computing device may further include a communication component 22 such as a wired or wireless modem, a storage memory 24, an antenna 26 for establishing a wireless connection 32 to a wireless network 30, and/or the network interface 28 for connecting to a wired connection 44 to the Internet 40. The processor 14 may include any of a variety of hardware cores, for example a number of processor cores.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon. The SoC 12 may include one or more processors 14. The computing device 10 may include more than one SoCs 12, thereby increasing the number of processors 14 and processor cores. The computing device 10 may also include processors 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. In an embodiment, one or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a miss, because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The communication interface 18, communication component 22, antenna 26, and/or network interface 28, may work in unison to enable the computing device 10 to communicate over a wireless network 30 via a wireless connection 32, and/or a wired network 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information even after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
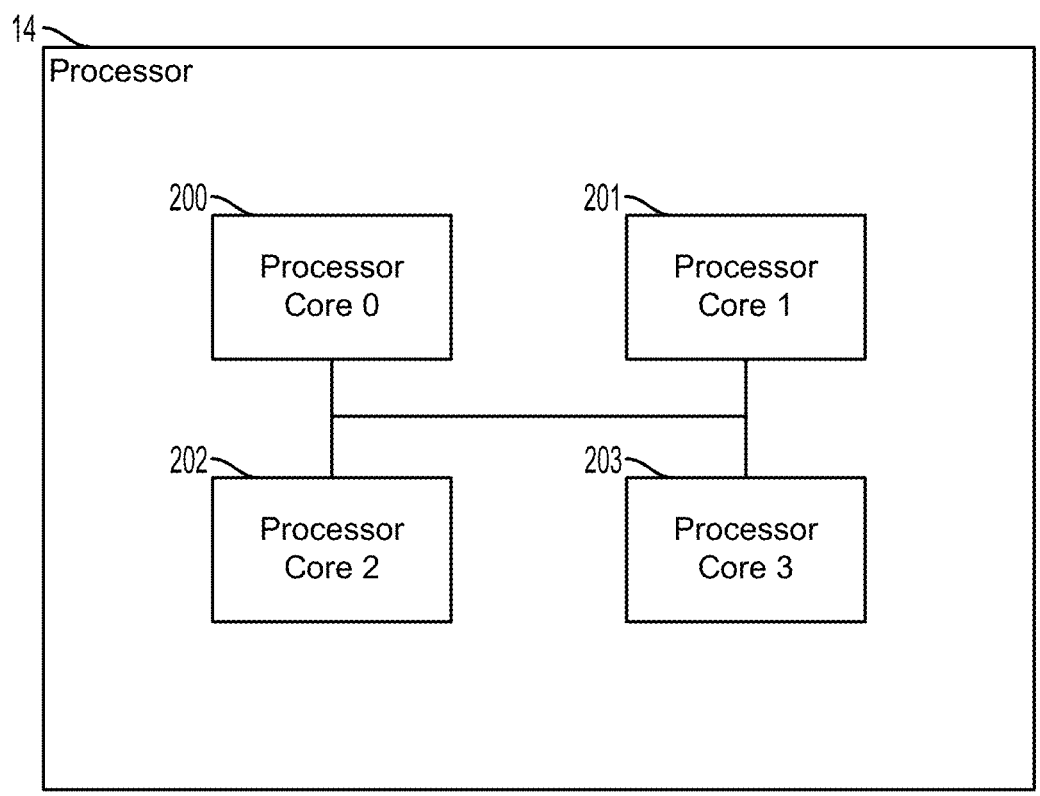
FIG. 2 is a component block diagram illustrating an example multi-core processor suitable for implementing an embodiment.

FIG. 2 illustrates a multi-core processor 14 suitable for implementing an embodiment. The multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that, the processor cores 200, 201, 202, 203 of a single processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big-.LITTLE" architectures in which slower, low-power processor cores may be coupled with more powerful and power-hungry processor cores. In similar embodiments, the SoC 12 may include a number of homogeneous or heterogeneous processors 14.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to limit the various embodiments to a four-core processor system. The computing device 10, the SoC 12, or the multi-core processor 14 may individually or in combination include fewer or more than the four processor cores 200, 201, 202, 203 illustrated and described herein.

Figure 3:
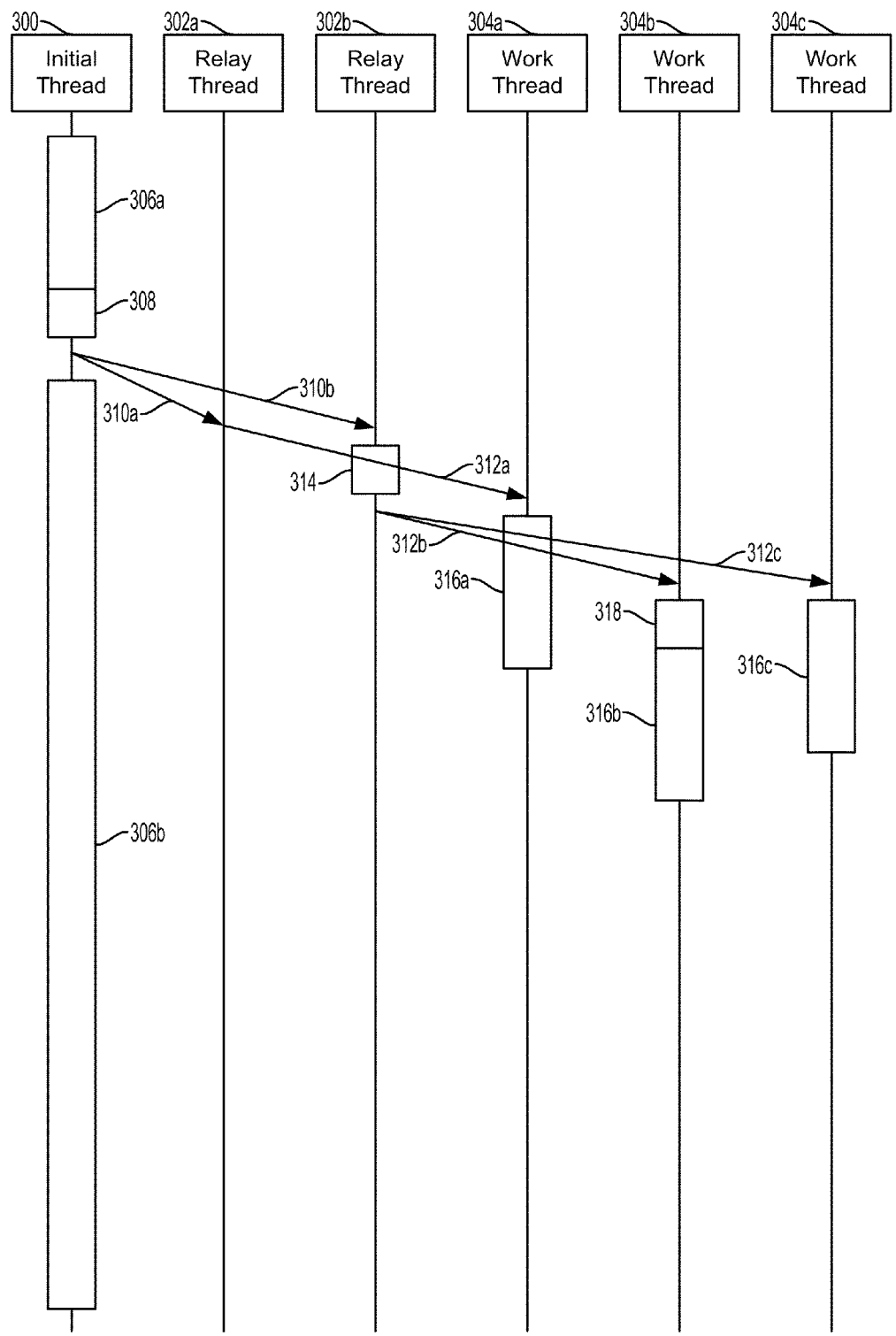
FIG. 3 is a process flow signaling diagram illustrating an example of task signaling off of a critical path of execution with direct initial signaling according to an embodiment.

FIG. 3 illustrates an example of task signaling off a critical path of execution with direct initial signaling according to an embodiment. In various embodiments, the initial thread 300, the relay threads 302a-302b, and the work threads 304a-304c, may be implemented on different processor cores of a multi-core processor, multithreaded processor, or across various processors of various configurations.

The initial thread 300 may execute a task 306a of a program on a critical path for execution of the program. The task may be for executing a process of the program. The process may include a parallel section, such as a loop, for which the process may become an outer process and iterations of the loop include at least one execution of an inner process. The inner process may be configured such that the inner process may be executed in parallel with the outer process and iterations of the inner process as well. For example, the initial thread 300 may execute the outer process while one or more other threads (e.g., work threads 304a-304c or relay threads 302a-302b) execute iterations of the inner process.

Upon encountering the loop, the initial thread 300 may interrupt the execution of the task 306a to divide the iterations of the inner loop and create parallel tasks 308 for executing the inner loop. The number of iterations per parallel task and the number of parallel tasks created may be determined by various factors, including latency requirements for executing the parallel tasks, power or resource (e.g., processors, processor cores, memory, bandwidth, relay threads 302a-302b, and work threads 304a-304c) requirements for executing the parallel tasks, resource availability for executing the parallel tasks, and programming. The parallel tasks may be configured with the same number or different numbers of iterations of the inner process. The number of parallel tasks created may be equal to, greater than, or less than the number of work threads 304a-304c and/or relay threads 302a-302b.

The initial thread 300 may send a direct initial signal 310a, 310b to at least one of the relay threads 302a-302b to wake up and/or notify the relay threads 302a-302b of the creation of a parallel task, and the initial thread 300 may return to executing the task 306b. In various embodiments, the relay threads 302a-302b may each be in one of various states, including active or wait (e.g., idle and inactive).

The state of a relay thread 302a-302b may be determined by various factors, including latency, power, or resource requirements for executing the parallel tasks, power or resource availability, and programming. For example, because latency of execution of the parallel tasks may be affected by the time it takes to move a relay thread 302a-302b from an inactive or idle state to an active state, lower latency requirements may benefit from having more relay threads 302a-302b active; more relay threads 302a-302b idle may be sufficient for middle latency requirements; and more relay threads 302a-302b inactive may be sufficient for higher latency requirements. In other examples, because of the power required to keep a relay thread 302a-302b in an active or idle state, lower power requirements may benefit from having more relay threads 302a-302b inactive; more relay threads 302a-302b idle may be sufficient for middle power requirements; and more relay threads 302a-302b active may be sufficient for higher power requirements. Depending on the state of the relay thread 302a-302b receiving the direct initial signal, the response by the relay thread 302a-302b may vary.

In the example illustrated in FIG. 3, the relay thread 302a may be in an active state and the relay thread 302b may be in an idle state or an inactive state. In response to receiving the direct initial signal from the initial thread 300, the relay thread 302a may send a relay signal 312a-312c (e.g., 312a) to at least one of the work threads 304a-304c (e.g., 304a).

In response to receiving the direct initial signal from the initial thread 300, the relay thread 302b may wake up 314 and send a relay signal 312b, 312c to at least one of the work threads 304a-304c. The relay threads 302a-302b may send the relay signal to the work threads 304a-304c to wake up and/or notify the work threads 304a-304c of the creation of a parallel task. Similar to the relay threads 302a-302b, in various embodiments, the work threads 304a-304c may each be in one of various states, including active, idle, and inactive.

The state of a work thread 304a-304c may be determined by various factors, including latency, power, or resource requirements for executing the parallel tasks, power or resource availability, and programming. For example, because latency of execution of the parallel tasks may be affected by the time it takes to move a work thread 304a-304c from an inactive or idle state to an active state, lower latency requirements may benefit from having more work threads 304a-304c active; more work threads 304a-304c idle may be sufficient for middle latency requirements; and more work threads 304a-304c inactive may be sufficient for higher latency requirements. In other examples, because of the power required to keep a work thread 304a-304c in an active or idle state, lower power requirements may benefit from having more work threads 304a-304c inactive; more work threads 304a-304c idle may be sufficient for middle power requirements; and more work threads 304a-304c active may be sufficient for higher power requirements. Depending on the state of the work thread 304a-304c receiving the relay signal, the response by the work thread 304a-304c may vary.

In the example illustrated in FIG. 3, the work thread 304a may be in an active state, the work thread 304b may be in an idle state or an inactive state, and the work thread 304c may be in an active state. In response to receiving the relay signal from the relay thread 302a, the work thread 304a may acquire a parallel task and execute the parallel task 316a). In response to receiving the relay signal from the relay thread 302b, the work thread 304b may wake up 318, and acquire and execute a parallel task 316b. In response to receiving the relay signal from the relay thread 302b, the work thread 304c may acquire a parallel task and execute the parallel task 316c. While acquiring and executing a parallel task, the work threads 304a-304c may enter into a work state. In various embodiments, some of the relay threads 302a-302b may also attempt to acquire and execute parallel tasks entering into the work state, while leaving at least one relay thread 302a-302b in the active, idle, or inactive state so that it may be available to receive additional direct initial signals from the initial thread 300.

In various embodiments, the relay threads 302a-302b and work threads 304a-304c may be in the work state, in which the relay threads 302a-302b and work threads 304a-304c may be executing a task and may not receive or accept a direct initial signal from the initial thread 300 or a relay signal from the relay threads 302a-302b. Upon completing the task executed during the work state, the relay threads 302a-302b and work threads 304a-304c may attempt to acquire a parallel task, or may change to an active, idle, or inactive state. To which state the relay threads 302a-302b and work threads 304a-304c changes from the work state may be determined by various factors, including latency, power, or resource requirements for executing the parallel tasks, power or resource availability, programming, and availability of parallel tasks.

Figure 4:
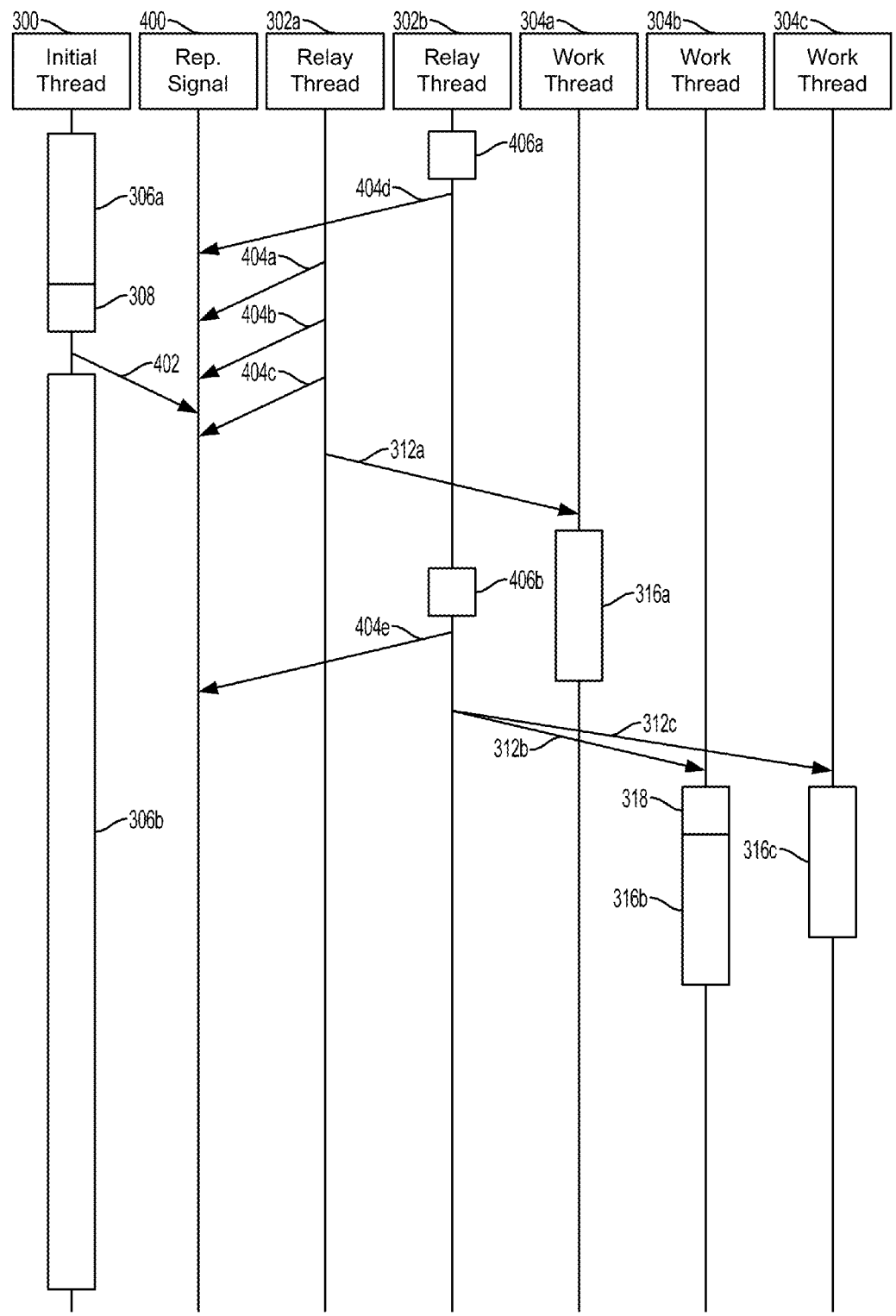
FIG. 4 is a process flow signaling diagram illustrating an example of task signaling off of a critical path of execution with indirect initial signaling according to an embodiment.

FIG. 4 illustrates an example of task signaling off a critical path of execution with indirect initial signaling according to an embodiment. The descriptions with reference to the example illustrated in FIG. 3 also apply to the example illustrated in FIG. 4 with the following differences. Rather than direct initial signaling between the initial thread 300 and the relay threads 302a-302b, the initial thread 300 may indirectly signal the relay threads 302a-302b by initiating a change in value of a signal representative ("rep. signal") 400. The signal representative 400 may include any hardware device to which the relay threads 302a-302b have access and can detect a change in the representative signal. In a non-limiting example, the representative signal 400 may include a Boolean flag written to a location in a memory device (e.g., a cache memory, a random access memory, a register, other solid-state volatile memory) that may indicate the creation of or lack of parallel tasks. The initial thread 300 may send a modification signal 402 to the signal representative 400 to indicate the creation of parallel tasks.

Regardless of the state of the relay threads 302a-302b, the relay threads may periodically check 404a-404e the signal representative 400 for an indication of the creation of parallel tasks. For example, a relay thread 302a in an active state may repeatedly check (404a-404c) the signal representative 400 for an indication of the creation of parallel tasks until it detects the indication of the creation of parallel tasks. In response to detecting an indication of the creation of parallel tasks, the relay thread 302a may proceed in the manner described with reference to the example illustrated in FIG. 3 after the relay thread 302a received the direct initial signal from the initial thread 300. A relay thread 302b that is in an idle state or an inactive state may repeatedly wake up 406a, 406b and check (404d, 404e) the signal representative 400 for an indication of the creation of parallel tasks until it detects the indication of the creation of parallel tasks. In various embodiments, a relay thread 302b in an idle state may wake up 406a, 406b and check 404d, 404e more frequently than a relay thread that is in an inactive state. In response to detecting the indication of the creation of parallel tasks, the relay thread 302b may proceed in the manner described with reference to the example illustrated in FIG. 3 after the relay thread 302b received the direct initial signal from the initial thread 300 and woke up.

Figure 5:
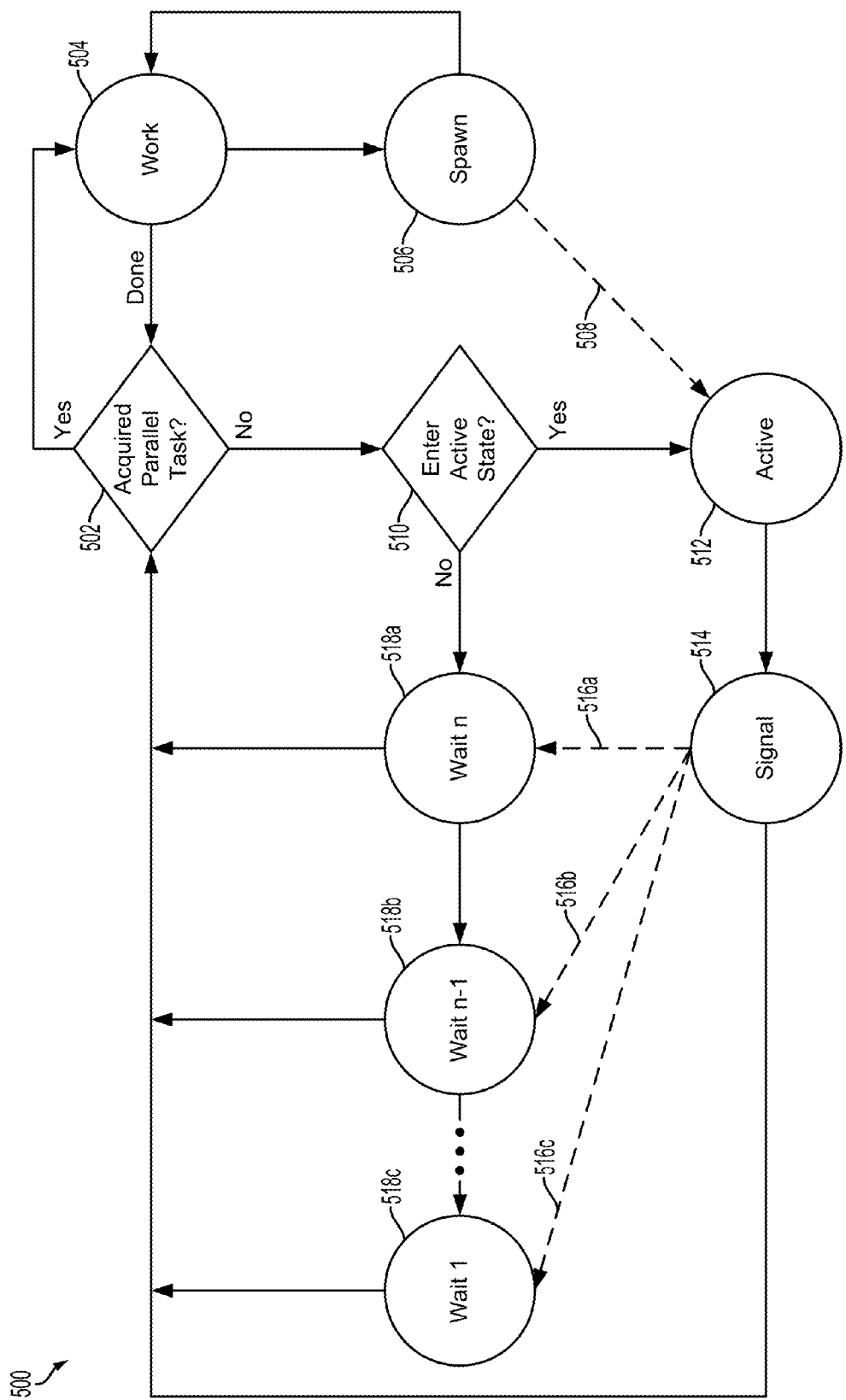
FIG. 5 is a state diagram illustrating a state progression for a thread used to implement task signaling off of a critical path of execution according to an embodiment.

FIG. 5 illustrates a state progression 500 for a thread used to implement critical task signaling off a critical path of execution according to an embodiment. In various embodiments, the state progression 500 may apply for any thread, including the initial thread, the relay threads, and the work threads. In determination block 502, a thread may determine whether it has acquired a parallel task to execute.

In response to determining that it has acquired a tasks to execute (i.e., determination 502="Yes"), the thread may enter a work state 504 to execute the task and return to determine whether another task is acquired in determination block 502 in response to completing the task. In various embodiments, an initial thread executing its acquired task during the work state 504 may encounter a parallel section, such as a loop, and enter a spawn state 506 to create parallel tasks and to send either direct or indirect initial signals 508 to notify a relay thread of the creation of the parallel task. Upon completion of the creation of parallel tasks and signaling the relay threads, the initial thread may return to the work state 504.

In response to determining that it has not acquired tasks to execute (i.e., determination 502="No"), the thread may determine whether to enter an active state 512 in determination block 510. The determination of whether to enter an active state may be determined by various factors, including latency, power, or resource requirements for executing the parallel tasks, power or resource availability, programming, and availability of parallel tasks.

In response to determining to enter the active state 512 (i.e., determination block 510="Yes"), the thread may enter into and remain in the active state 512 checking for a direct or indirect initial signal 508 indicating the creation of a parallel task. In response to receiving a direct or indirect initial signal 508, the thread may enter into a signal state 514 and send a relay signal 516a-516c to other threads in wait states 518a-518c. The thread in the signal state 514 may determine whether it has acquired a parallel task to execute in determination block 502.

In response to determining not to enter the active state 512 (i.e., determination block 510="No"), the thread may enter into and remain in a wait state 518a-518c (e.g., varying levels of idle and inactive) until either receiving a relay signal 516a-516c or until surpassing a state change threshold triggering a change to a lower wait state 518a-518c.

In response to receiving a relay signal 516a-516c, the threads in the wait state 518a-518c may each determine whether it has acquired a parallel task to execute in determination block 502. In various embodiments, the state change threshold triggering a change to a lower wait state 518a-518c may include various threshold values corresponding with latency, power, or resource requirements for executing the parallel tasks, power or resource availability, programming, availability of parallel tasks, and time. The thread entering a wait state may enter directly into one of any wait states 518a-518c based on these factors, for example. In an embodiment, the thread may enter into wait state 518a being the highest wait state (i.e., having the lowest latency to switching to an active or work state from among the wait states 518a-518c).

In response to surpassing the state change threshold, the thread may enter a next lower wait state 518b (i.e., having a higher latency to switching to an active or work state compared to the highest wait state 518a). This step down in wait state level may continue each time another state change threshold is surpassed until reaching a lowest wait state 518c (i.e., having the highest latency to switching to an active or work state from among the wait states 518a-518c).

Figure 6:
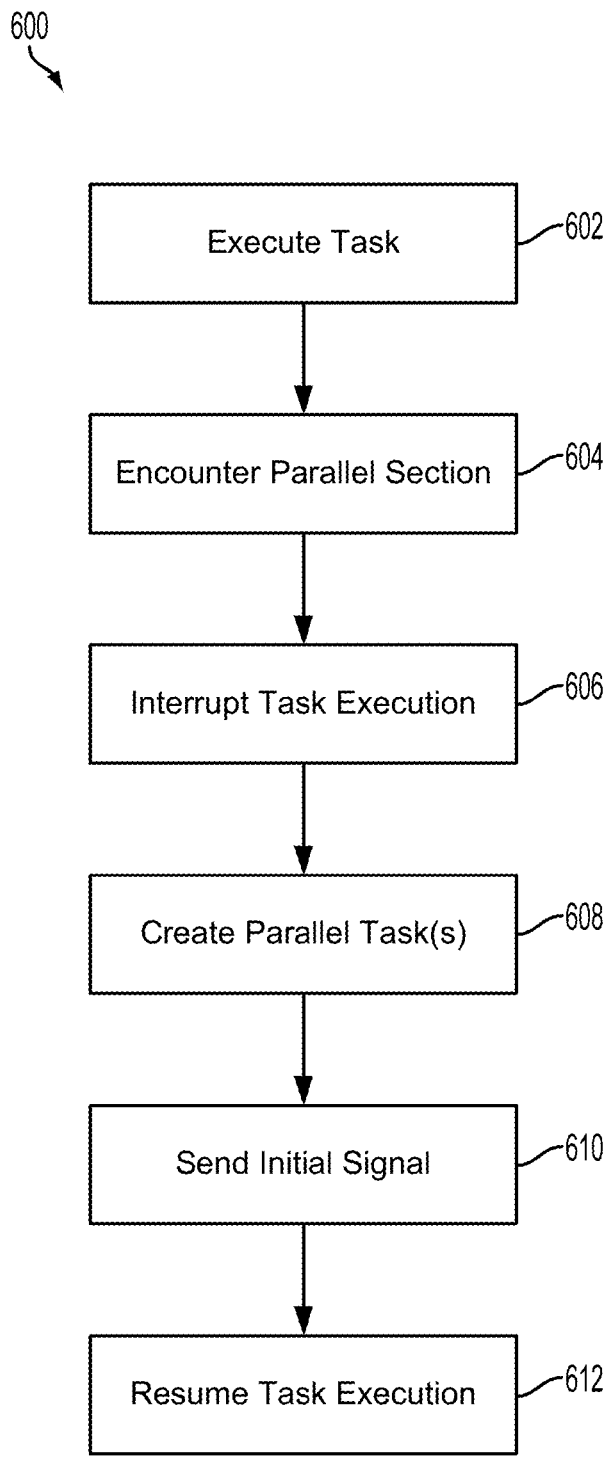
FIG. 6 is a process flow diagram illustrating an embodiment method for initial signaling in task signaling off of a critical path of execution.

FIG. 6 illustrates an embodiment method 600 for initial signaling in task signaling off a critical path of execution. The method 600 may be executed in a computing device using software, and/or general purpose or dedicated hardware, such as the processor.

In block 602, the computing device may execute a task of a process of a program using an initial thread. In block 604, the computing device may encounter a parallel section, such as a loop, during the execution of the function. The process may include a loop, for which the process becomes an outer process and iterations of the loop include at least one execution of an inner process. The inner process may be configured such that the inner process may be executed in parallel with the outer process and iterations of the inner process as well. For example, the initial thread may execute the outer process while one or more other threads (e.g., work threads or relay threads) execute iterations of the inner process.

In block 606, the computing device may interrupt the execution of the task. In block 608, the computing device may create parallel tasks for executing the inner loop. The parallel tasks may be configured so that together all of the parallel tasks include all of the iterations of the inner loop; however, it is not necessary for each parallel task to be configured to execute the same number of iterations of the inner loop.

In block 610, the computing device may send an initial signal. In various embodiments, depending on the configuration of the computing device, the initial signal may be either a direct initial signal or an indirect initial signal. A direct initial signal may be sent by the computing device between processors or processor cores of the computing device via communication networks within the computing device, such as shared or common busses or a network on chip, or via dedicated direct signaling lines or wires connecting the processors or processor cores. The direct initial signal may be sent from the processor or processor core executing the initial thread to a processor or processor core executing a relay thread. In various embodiments, a group of all relay threads in active or wait states may be available to receive a direct initial signal from any initial thread. In various embodiments, sets of relay threads, smaller than a set of all relay threads of the computing device, may be designated to receive direct initial signals from a particular initial thread. In various embodiments, the initial thread may be configured to broadcast the direct initial signal, which may be ignored by relay threads that are not associated with the initial thread, or send the direct initial signal to associated relay threads.

As discussed herein, the relay threads may be in various execution states, including active and wait states (e.g., idle and inactive). The direct initial signal may be configured to trigger a relay thread in a wait state to wake up and to indicate to the relay thread that parallel tasks have been created for execution by threads other than the initial thread.

An indirect initial signal may be sent by the computing device between the processor or processor core of the computing device executing the initial thread and a memory device (e.g., a cache memory, a random access memory, a register, other solid-state volatile memory) via communication networks within the computing device, such as shared or common busses or a network on chip. The indirect initial signal may be configured to modify the memory device such that it may indicate the creation of or lack of parallel tasks. For example, a designated location in the memory device may be accessible by at least one relay thread to determine whether there are any parallel tasks created. The indirect initial signal may trigger a change in the data stored at the memory location such that the change may indicate to the relay thread that a parallel task has been created. Various examples may include a Boolean flag written to the memory location, and the Boolean flag having two values representing either a lack of parallel tasks or the creation of parallel tasks. In other examples, the value of the Boolean flag may not specifically represent either the lack of the creation of parallel tasks; rather a change in the Boolean flag value may indicate the creation of parallel tasks. In various embodiments, the relay thread may need to be at least temporarily in an active state to check for whether the indirect initial signal was sent to the memory device.

In block 612, the computing device may resume executing the interrupted task.

Figure 7:
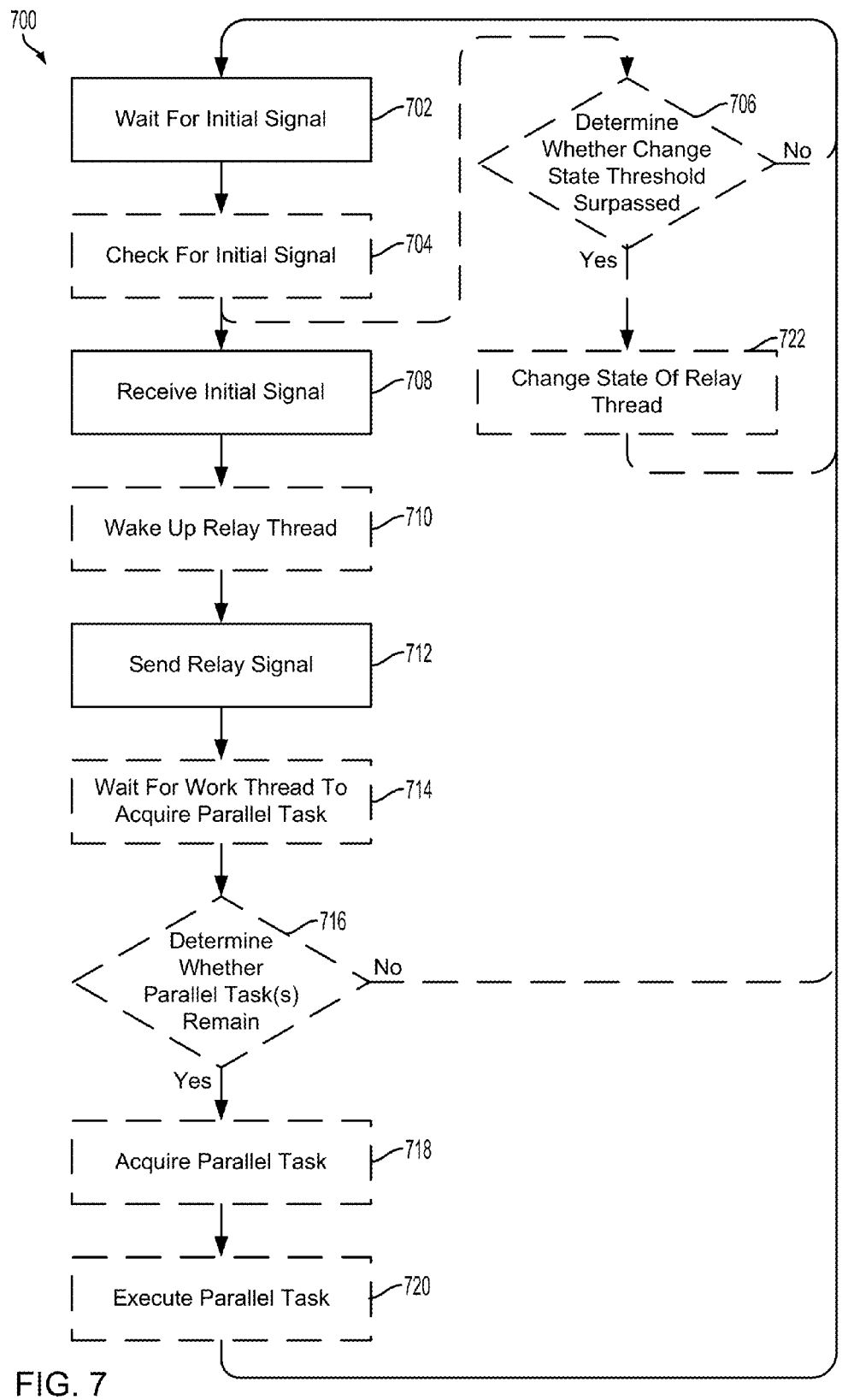
FIG. 7 is a process flow diagram illustrating an embodiment method for relay signaling in task signaling off of a critical path of execution.

FIG. 7 illustrates an embodiment method 700 for relay signaling in task signaling off a critical path of execution. The method 700 may be executed in a computing device using software, and/or general purpose or dedicated hardware, such as the processor.

In block 702, the computing device may wait for a direct or indirect initial signal from the initial thread. Regardless of the state of a relay thread, there may be at least a momentary wait between checks for a direct or indirect initial signal, even if it is during the time when the relay thread waits for the return of an issued check for a direct or indirect initial signal.

In optional block 704, the computing device may check for a direct or indirect initial signal. In various embodiments, the relay thread may check for a direct or indirect initial signal from an active state. The relay thread may be persistently in an active state, or may transition between a wait state (e.g., idle or inactive) and an active state to check for a direct or indirect initial signal. In various embodiments, a relay thread may skip checking for a direct or indirect initial signal when in a wait state as checking may consume resources. As discussed herein, the relay thread may check a designated location of a memory device to detect an indirect initial signal.

Concurrently with various blocks of the method 700 (e.g., concurrent with one or more of block 702 and optional block 704), in optional determination block 706, the computing device may determine whether a state change threshold is surpassed. In various embodiments, the state change threshold may include various threshold values corresponding with latency, power, or resource requirements for executing the parallel tasks, power or resource availability, programming, availability of parallel tasks, and time.

In response to determining that a state change threshold is not surpassed (i.e., optional determination block 706="No"), the computing device may return to waiting for a direct or indirect initial signal from the initial thread in block 702.

In response to determining that a state change threshold is surpassed (i.e., optional determination block 706="Yes"), the computing device may change the state of the relay thread in optional block 722. In various embodiments, the relay thread may be downgraded from an active state to one of a number of levels of wait states (e.g., idle or inactive), downgraded from one level of wait state to a lower level of wait state, upgraded from one level of wait state to a higher level of wait state, or upgraded from a level of wait state to an active state.

In block 702, the computing device may wait for a direct or indirect initial signal from the initial thread. In block 708, the computing device may receive a direct or indirect initial signal from the initial thread. In various embodiments, receiving a direct initial signal may include receiving the signal from the initial thread via communication networks within the computing device.

In various embodiments, receiving an indirect initial signal may include retrieving data from the designated location of the memory device indicating the creation of parallel tasks during the check for the indirect initial signal in optional block 704. In various embodiments, the relay thread may receive a direct or indirect initial signal from an initial thread with which it is not associated and may ignore the direct or indirect initial signal.

In optional block 710, the computing device may wake up the relay thread from a wait state. Optional block 710 may not be implemented for a relay thread in an active state.

In block 712, the computing device may send a relay signal to at least one work thread. As with the various embodiments of the initial thread discussed with reference to FIG. 6, a group of all work threads in active or wait states may be available to receive a relay signal from any relay thread. In various embodiments, sets of work threads, smaller than a set of all work threads of the computing device, may be designated to receive relay signals from a particular relay thread.

In various embodiments, the relay thread may be configured to broadcast the relay signal, which may be ignored by work threads that are not associated with the relay thread, or send the relay signal to associated work threads. The work threads may be in various execution states, including active and wait states (e.g., idle and inactive). The relay signal may be configured to trigger a work thread in a wait state to wake up and to indicate to the work thread that parallel tasks have been created for execution by threads other than the initial thread.

The signaling overhead for signaling the work threads is absorbed by the relay thread rather than the initial thread so that the initial thread may return to executing its task without having to wait for the acquisition of the parallel tasks it created.

In optional block 714, the computing device may wait for the at least one work thread to acquire a parallel task. This waiting overhead is absorbed by the relay thread rather than the initial thread so that the initial thread may return to executing its task without having to wait for the acquisition of the parallel tasks it created.

In optional determination block 716, the computing device may determine whether any parallel tasks remain. In response to determining that parallel tasks remain (i.e., optional determination block 716="Yes"), the computing device may acquire a remaining parallel task for the relay thread in optional block 718. In various embodiments, the relay thread may aid in executing the parallel tasks. However, there may be limits as to how many relay threads may execute parallel tasks so that there are sufficient relay threads available to handle relay signaling for any subsequent parallel tasks. In various embodiments, work threads that finish executing a parallel task before a relay thread finishes executing a parallel task may be reassigned as a relay thread to make up for a dearth of relay threads. Similarly, an excess of relay threads may result in a relay thread getting reassigned as a work thread.

In optional block 720, the computing device may use the relay thread to execute the acquired parallel task. Upon completing the execution of the acquired parallel task, the computing device may return to determining whether parallel tasks remain in optional determination block 716. In response to determining that no parallel tasks remain (i.e., optional determination block 716="No"), the computing device may return to waiting for a direct or indirect initial signal from the initial thread in block 702.

Figure 8:
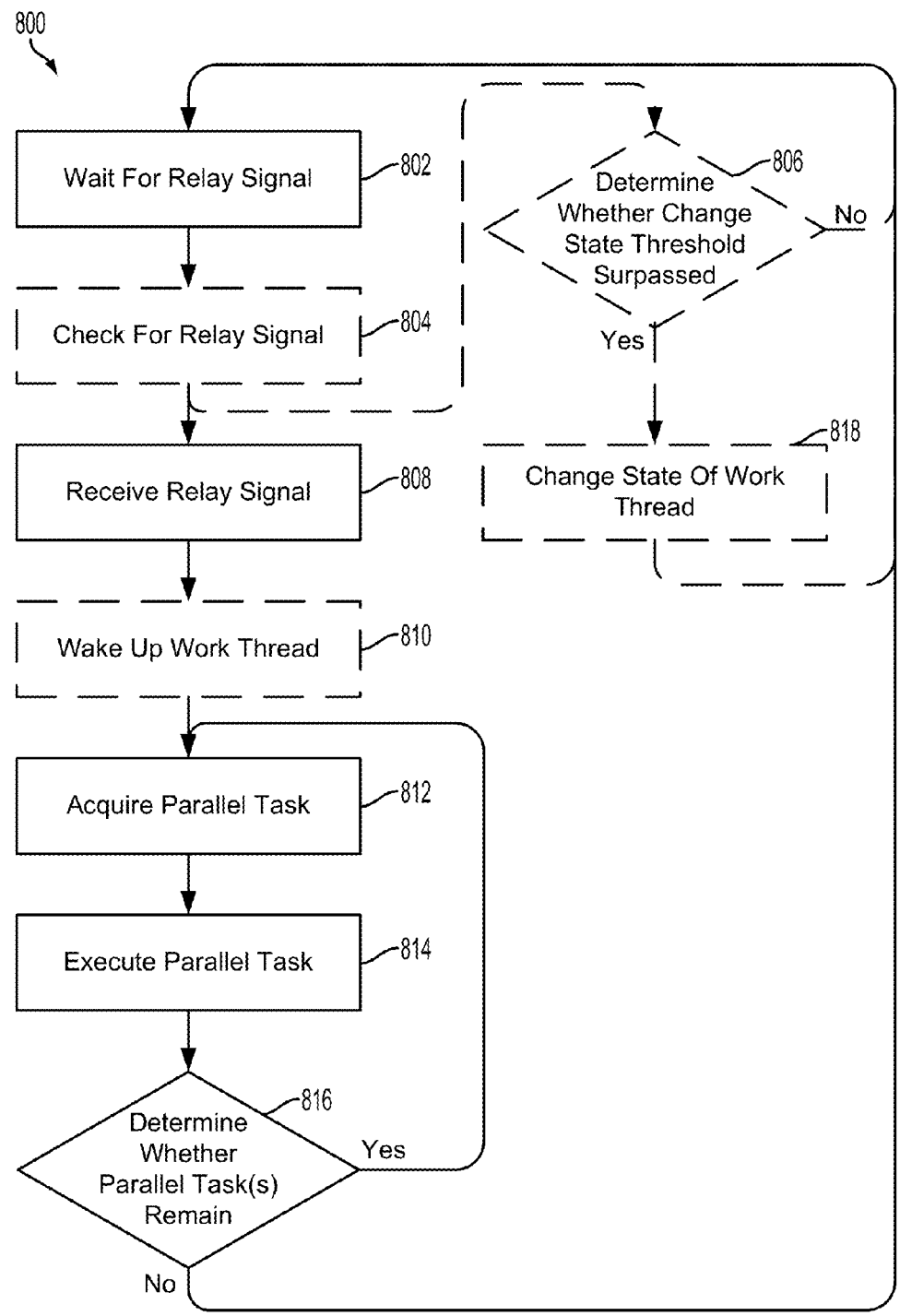
FIG. 8 is a process flow diagram illustrating an embodiment method for task execution in task signaling off of a critical path of execution.

FIG. 8 illustrates an embodiment method 800 for task execution in task signaling off a critical path of execution. The method 800 may be executed in a computing device using software, and/or general purpose or dedicated hardware, such as the processor.

In block 802, the computing device may wait for a relay signal from the relay thread. Regardless of the state of a work thread, there may be at least a momentary wait between checks for a relay signal, even if it is during the time when the work thread waits for the return of an issued check for a relay signal.

In optional block 804, the computing device may check for a relay signal. In various embodiments, the work thread may check for a relay signal from an active state. The work thread may be persistently in an active state, or may transition between a wait state (e.g., idle or inactive) and an active state to check for a relay signal. In various embodiments, a work thread may skip checking for a relay signal when in a wait state as checking may consume resources.

Concurrently with various blocks of the method 800 (e.g., concurrent with one or more of block 802 and optional block 804), the computing device may determine whether a state change threshold is surpassed in optional determination block 806. In various embodiments, the state change threshold may include various threshold values corresponding with latency, power, or resource requirements for executing the parallel tasks, power or resource availability, programming, availability of parallel tasks, and time.

In response to determining that a state change threshold is not surpassed (i.e., optional determination block 806="No"), the computing device may return to waiting for a relay signal from the relay thread in block 802.

In response to determining that a state change threshold is surpassed (i.e., optional determination block 806="Yes"), the computing device may change the state of the work thread in optional block 818. In various embodiments, the work thread may be downgraded from an active state to one of a number of levels of wait states (e.g., idle or inactive), downgraded from one level of wait state to a lower level of wait state, upgraded from one level of wait state to a higher level of wait state, or upgraded from a level of wait state to an active state.

In block 802, the computing device may wait for a relay signal from the relay thread. In block 808, the computing device may receive a relay signal from the relay thread. In various embodiments, receiving a relay signal may include receiving the signal from the relay thread via communication networks within the computing device. In various embodiments, the work thread may receive a relay signal from a relay thread with which it is not associated and may ignore the relay signal.

In optional block 810, the computing device may wake up the work thread from a wait state. Optional block 810 may not be implemented for a work thread in an active state.

In block 812, the computing device may acquire a parallel task for the work thread. In block 814, the computing device may use the work thread to execute the acquired parallel task.

Upon completing the execution of the acquired parallel task, in determination block 816, the computing device may determine whether parallel tasks remain. In response to determining that parallel tasks remain (i.e., determination block 816="Yes"), the computing device may acquire a remaining parallel task for the work thread in block 812. In response to determining that no parallel tasks remain (i.e., determination block 816="No"), the computing device may return to waiting for a relay signal from the relay thread in block 802.

Figure 9:
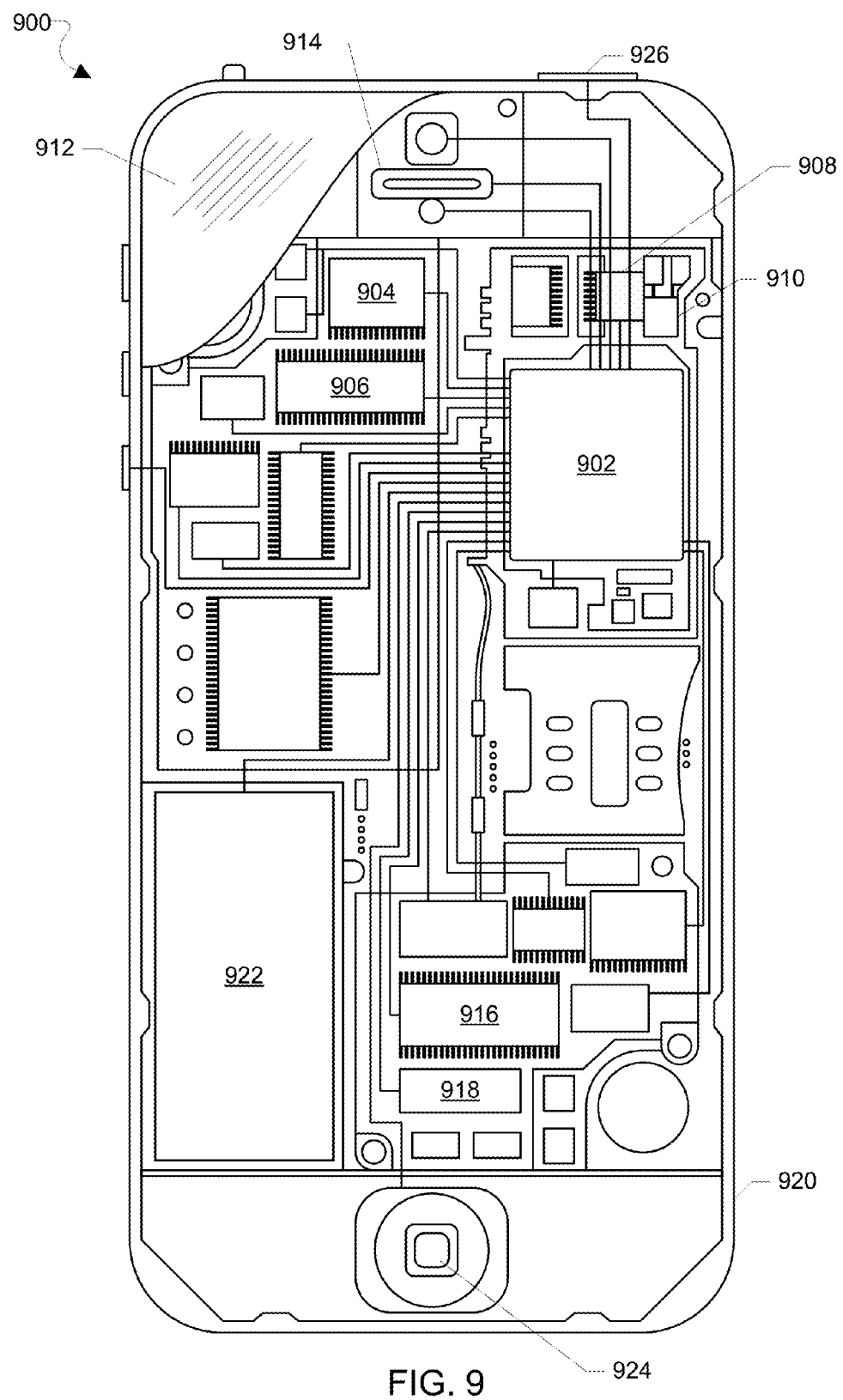
FIG. 9 is component block diagram illustrating an example mobile computing device suitable for use with the various embodiments.

The various embodiments (including, but not limited to, embodiments discussed above with reference to FIGS. 1-8) may be implemented in a wide variety of computing systems, which may include an example mobile computing device suitable for use with the various embodiments illustrated in FIG. 9. The mobile computing device 900 may include a processor 902 coupled to a touchscreen controller 904 and an internal memory 906. The processor 902 may be one or more multi-core integrated circuits designated for general or specific processing tasks. The internal memory 906 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded dynamic random access memory (DRAM). The touchscreen controller 904 and the processor 902 may also be coupled to a touchscreen panel 912, such as a resistive-sensing touchscreen, capacitive-sensing touchscreen, infra-red sensing touchscreen, etc. Additionally, the display of the computing device 900 need not have touch screen capability.

The mobile computing device 900 may have one or more radio signal transceivers 908 (e.g., Peanut, Bluetooth, Zig-Bee, Wi-Fi, RF radio) and antennae 910, for sending and receiving communications, coupled to each other and/or to the processor 902. The transceivers 908 and antennae 910 may be used with the above-mentioned circuitry to implement the various wireless transmission protocol stacks and interfaces. The mobile computing device 900 may include a cellular network wireless modem chip 916 that enables communication via a cellular network and is coupled to the processor.

The mobile computing device 900 may include a peripheral device connection interface 918 coupled to the processor 902. The peripheral device connection interface 918 may be singularly configured to accept one type of connection, or may be configured to accept various types of physical and communication connections, common or proprietary, such as USB, FireWire, Thunderbolt, or PCIe. The peripheral device connection interface 918 may also be coupled to a similarly configured peripheral device connection port (not shown).

The mobile computing device 900 may also include speakers 914 for providing audio outputs. The mobile computing device 900 may also include a housing 920, constructed of a plastic, metal, or a combination of materials, for containing all or some of the components discussed herein. The mobile computing device 900 may include a power source 922 coupled to the processor 902, such as a disposable or rechargeable battery. The rechargeable battery may also be coupled to the peripheral device connection port to receive a charging current from a source external to the mobile computing device 900. The mobile computing device 900 may also include a physical button 924 for receiving user inputs. The mobile computing device 900 may also include a power button 926 for turning the mobile computing device 900 on and off.

Figure 10:
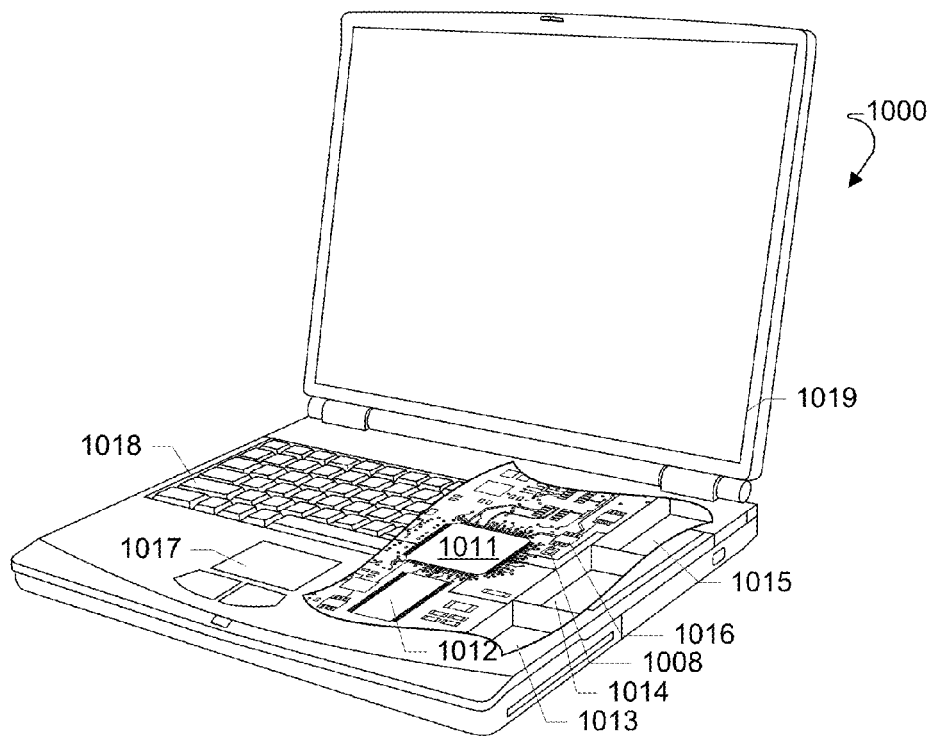
FIG. 10 is component block diagram illustrating an example mobile computing device suitable for use with the various embodiments.

The various embodiments (including, but not limited to, embodiments discussed above with reference to FIGS. 1-8) may be implemented in a wide variety of computing systems, which may include a variety of mobile computing devices, such as a laptop computer 1000 illustrated in FIG. 10. Many laptop computers include a touchpad touch surface 1017 that serves as the computer's pointing device, and thus may receive drag, scroll, and flick gestures similar to those implemented on computing devices equipped with a touch screen display and described above. A laptop computer 1000 will typically include a processor 1011 coupled to volatile memory 1012 and a large capacity nonvolatile memory, such as a disk drive 1013 of Flash memory. Additionally, the computer 1000 may have one or more antenna 1008 for sending and receiving electromagnetic radiation that may be connected to a wireless data link and/or cellular telephone transceiver 1016 coupled to the processor 1011. The computer 1000 may also include a floppy disc drive 1014 and a compact disc (CD) drive 1015 coupled to the processor 1011. In a notebook configuration, the computer housing includes the touchpad 1017, the keyboard 1018, and the display 1019 all coupled to the processor 1011. Other configurations of the computing device may include a computer mouse or trackball coupled to the processor (e.g., via a universal serial bus (USB) input) as are well known, which may also be used in conjunction with the various embodiments.

Figure 11:
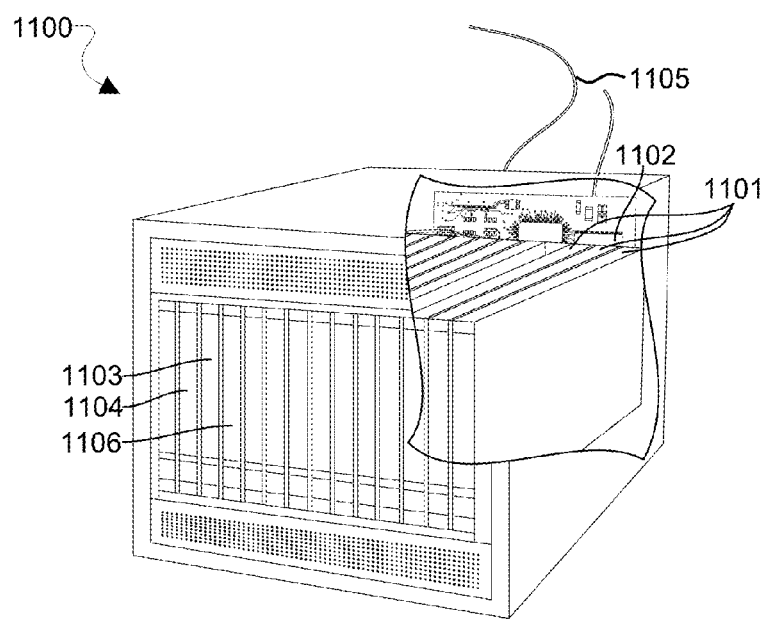
FIG. 11 is component block diagram illustrating an example server suitable for use with the various embodiments.

The various embodiments (including, but not limited to, embodiments discussed above with reference to FIGS. 1-8) may be implemented in a wide variety of computing systems, which may include any of a variety of commercially available servers for compressing data in server cache memory. An example server 1100 is illustrated in FIG. 11. Such a server 1100 typically includes one or more multi-core processor assemblies 1101 coupled to volatile memory 1102 and a large capacity nonvolatile memory, such as a disk drive 1104. As illustrated in FIG. 11, multi-core processor assemblies 1101 may be added to the server 1100 by inserting them into the racks of the assembly. The server 1100 may also include a floppy disc drive, compact disc (CD) or DVD disc drive 1106 coupled to the processor 1101. The server 1100 may also include network access ports 1103 coupled to the multi-core processor assemblies 1101 for establishing network interface connections with a network 1105, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of task signaling on a computing device, comprising:
    interrupting execution of a task by an initial thread on a critical path of execution;
    creating at least one parallel task by the initial thread;
    sending, to a relay thread by the initial thread, an initial signal indicating the at least one parallel task is created;
    resuming execution of the task by the initial thread before an acquisition of the at least one parallel task; and
    executing the at least one parallel task in parallel with the execution of the task.

2. The method of claim 1, further comprising:
    receiving the initial signal by the relay thread; and
    changing the relay thread to an active state in response to receiving the initial signal when the relay thread is in a wait state.

3. The method of claim 2, wherein the initial signal is a direct initial signal, and wherein receiving the initial signal by the relay thread comprises receiving the direct initial signal via a connection with the initial thread.

4. The method of claim 2, wherein the initial signal is an indirect initial signal, the method further comprising:
    modifying data at a location of a memory device indicating the creation of the at least one parallel task, wherein receiving the initial signal by the relay thread comprises retrieving the modified data from the location of the memory device.

5. The method of claim 2, further comprising sending a relay signal indicating the creation of the at least one parallel task to at least one work thread.

6. The method of claim 5, further comprising:
    receiving the relay signal by the at least one work thread;
    changing the at least one work thread to an active state in response to receiving the relay signal when the at least one work thread is in a wait state; and
    acquiring the at least one parallel task by the at least one work thread; and
    wherein executing the at least one parallel task in parallel with the execution of the task comprises executing the at least one parallel task by the at least one work thread in parallel with the execution of the task by the initial thread.

7. The method of claim 2, further comprising:
    determining whether another parallel task remains by the relay thread;
    acquiring the another parallel task by the relay thread; and
    executing the another parallel task by the relay thread in parallel with the execution of the task by the initial thread.

8. The method of claim 1, further comprising:
    determining whether a state change threshold for the relay thread is surpassed; and
    changing a state of the relay thread from an active state to a wait state or from a level of the wait state to a lower level of the wait state in response to determining that the state change threshold for the relay thread is surpassed.

9. A computing device, comprising:
a plurality of processor cores communicatively connected to each other, wherein the plurality of processor cores includes a first processor core configured to execute an initial thread, a second processor core configured to execute a relay thread, and a third processor core configured to execute a work thread, and wherein the first processor core is configured with processor-executable instructions to perform operations comprising:
interrupting execution of a task by the initial thread on a critical path of execution;
creating at least one parallel task by the initial thread;
sending, to the relay thread by the initial thread, an initial signal indicating the at least one parallel task is created;
resuming execution of the task by the initial thread before an acquisition of the at least one parallel task; and
executing the at least one parallel task in parallel with the execution of the task.

10. The computing device of claim 9, wherein the second processor core is configured with processor-executable instructions to perform operations comprising:
receiving the initial signal by the relay thread; and
changing the relay thread to an active state in response to receiving the initial signal when the relay thread is in a wait state.

11. The computing device of claim 10, wherein the initial signal is a direct initial signal, and wherein the second processor core is configured with processor-executable instructions to perform operations such that receiving the initial signal by the relay thread comprises receiving the direct initial signal via a connection with the first processor core executing the initial thread.

12. The computing device of claim 10, further comprising a memory device communicatively connect to the first processor core and the second processor core,
wherein the initial signal is an indirect initial signal,
wherein the first processor core is configured with processor-executable instructions to perform operations further comprising modifying data at a location of the memory device indicating the creation of the at least one parallel task, and
wherein the second processor core is configured with processor-executable instructions to perform operations such that receiving the initial signal by the relay thread comprises retrieving the modified data from the location of the memory device.

13. The computing device of claim 10, wherein the second processor core is configured with processor-executable instructions to perform operations further comprising:
sending a relay signal indicating the creation of the at least one parallel task to at least one work thread.

14. The computing device of claim 13, wherein the third processor core is configured with processor-executable instructions to perform operations comprising:
receiving the relay signal by the work thread;
changing the work thread to an active state in response to receiving the relay signal when the work thread is in a wait state; and
acquiring the at least one parallel task by the work thread; and
wherein executing the at least one parallel task in parallel with the execution of the task comprises executing the at least one parallel task by the work thread in parallel with the execution of the task by the initial thread.

15. The computing device of claim 10, wherein the second processor core is configured with processor-executable instructions to perform operations further comprising:
determining whether another parallel task remains by the relay thread;
acquiring the another parallel task by the relay thread; and
executing the another parallel task by the relay thread in parallel with the execution of the task by the initial thread.

16. The computing device of claim 9, wherein the second processor core is configured with processor-executable instructions to perform operations further comprising:
determining whether a state change threshold for the relay thread is surpassed; and
changing a state of the relay thread from an active state to a wait state or from a level of the wait state to a lower level of the wait state in response to determining that the state change threshold for the relay thread is surpassed.

17. A computing device, comprising:
means for interrupting execution of a task by an initial thread on a critical path of execution;
means for creating at least one parallel task by the initial thread;
means for sending, to a relay thread by the initial thread, an initial signal indicating the at least one parallel task is created;
means for resuming execution of the task by the initial thread before an acquisition of the at least one parallel task; and
means for executing the at least one parallel task in parallel with the execution of the task.

18. The computing device of claim 17, further comprising:
means for receiving the initial signal by the relay thread; and
means for changing the relay thread to an active state in response to receiving the initial signal when the relay thread is in a wait state.

19. The computing device of claim 18, wherein the initial signal is a direct initial signal, and
wherein means for receiving the initial signal by the relay thread comprises means for receiving the direct initial signal via a connection with the initial thread.

20. The computing device of claim 18, wherein the initial signal is an indirect initial signal, and
wherein the computing device further comprises means for modifying data at a location of a memory device indicating the creation of the at least one parallel task, wherein means for receiving the initial signal by the relay thread comprises means for retrieving the modified data from the location of the memory device.

21. The computing device of claim 18, further comprising:
means for sending a relay signal indicating the creation of the at least one parallel task to at least one work thread;
means for receiving the relay signal by the at least one work thread;
means for changing the at least one work thread to an active state in response to receiving the relay signal when the at least one work thread is in a wait state; and
means for acquiring the at least one parallel task by the at least one work thread; and
wherein means for executing the at least one parallel task in parallel with the execution of the task comprises means for executing the at least one parallel task by the at least one work thread in parallel with execution of the task by the initial thread.

22. The computing device of claim 18, further comprising:
means for determining whether another parallel task remains by the relay thread;
means for acquiring the another parallel task by the relay thread; and
means for executing the another parallel task by the relay thread in parallel with execution of the task by the initial thread.

23. The computing device of claim 17, further comprising:
means for determining whether a state change threshold for the relay thread is surpassed; and
means for changing a state of the relay thread from an active state to a wait state or from a level of the wait state to a lower level of the wait state in response to determining that the state change threshold for the relay thread is surpassed.

24. A non-transitory processor-readable storage medium having stored thereon processor-executable instructions configured to cause a processor of a computing device to perform operations comprising:
interrupting execution of a task by an initial thread on a critical path of execution;
creating at least one parallel task by the initial thread;
sending, to a relay thread by the initial thread, an initial signal indicating the at least one parallel task is created;
resuming execution of the task by the initial thread before an acquisition of the at least one parallel task; and
executing the at least one parallel task in parallel with the execution of the task.

25. The non-transitory processor-readable storage medium of claim 24, wherein the stored processor-executable instructions are configured to cause the processor to perform operations further comprising:
receiving the initial signal by the relay thread; and
changing the relay thread to an active state in response to receiving the initial signal when the relay thread is in a wait state.

26. The non-transitory processor-readable storage medium of claim 25, wherein the initial signal is a direct initial signal, and
wherein the stored processor-executable instructions are configured to cause the processor to perform operations such that receiving the initial signal by the relay thread comprises receiving the direct initial signal via a connection with the initial thread.

27. The non-transitory processor-readable storage medium of claim 25, wherein the initial signal is an indirect initial signal, and
wherein the stored processor-executable instructions are configured to cause the processor to perform operations further comprising:
modifying data at a location of a memory device indicating the creation of the at least one parallel task, wherein receiving the initial signal by the relay thread comprises retrieving the modified data from the location of the memory device.

28. The non-transitory processor-readable storage medium of claim 25, wherein the stored processor-executable instructions are configured to cause the processor to perform operations further comprising:
sending a relay signal indicating the creation of the at least one parallel task to at least one work thread;
receiving the relay signal by the at least one work thread;
changing the at least one work thread to an active state in response to receiving the relay signal when the at least one work thread is in a wait state; and
acquiring the at least one parallel task by the at least one work thread; and
wherein executing the at least one parallel task in parallel with the execution of the task comprises executing the at least one parallel task by the at least one work thread in parallel with the execution of the task by the initial thread.

29. The non-transitory processor-readable storage medium of claim 25, wherein the stored processor-executable instructions are configured to cause the processor to perform operations further comprising:
determining whether another parallel task remains by the relay thread;
acquiring the another parallel task by the relay thread; and
executing the another parallel task by the relay thread in parallel with the execution of the task by the initial thread.

30. The non-transitory processor-readable storage medium of claim 24, wherein the stored processor-executable instructions are configured to cause the processor to perform operations further comprising:
determining whether a state change threshold for the relay thread is surpassed; and
changing a state of the relay thread from an active state to a wait state or from a level of the wait state to a lower level of the wait state in response to determining that the state change threshold for the relay thread is surpassed.

* * * * *